3,252,741
BRAKING SYSTEMS
Raymond Leonard Anscombe, King's Cross, London, England, assignor to Westinghouse Brake and Signal Company, Limited, London, England
Filed Nov. 21, 1963, Ser. No. 325,324
5 Claims. (Cl. 303—59)

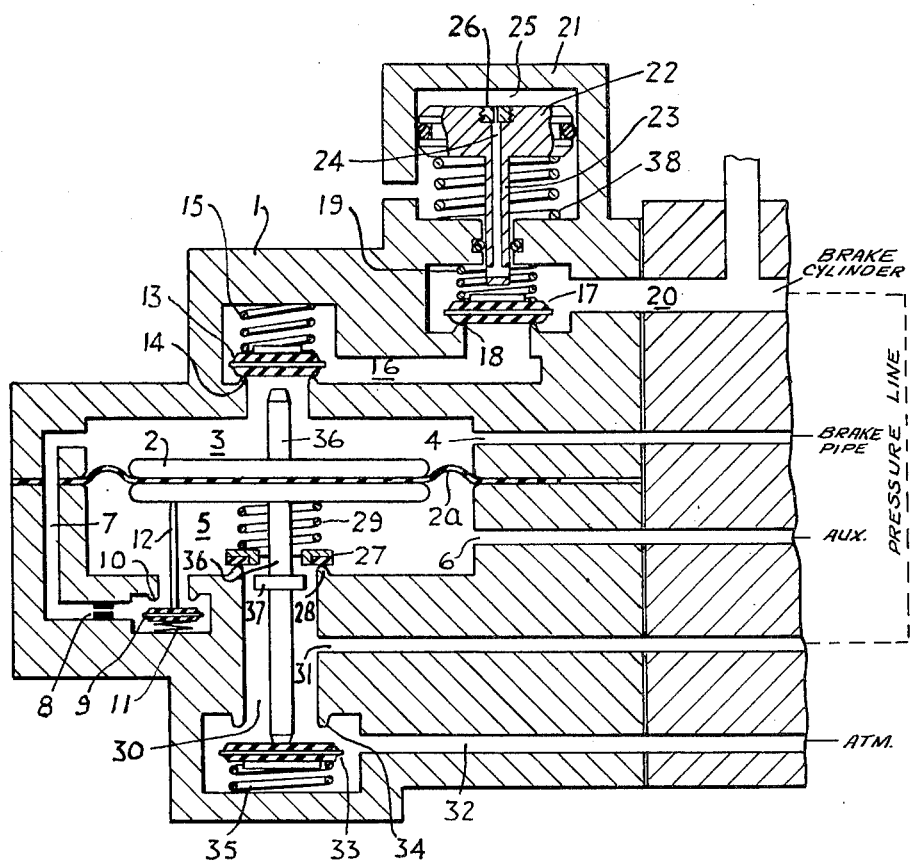

The present invention relates to braking apparatus and more particularly to those braking systems which employ triple valves.

According to the present invention there is provided compressed-fluid braking apparatus comprising a triple valve of the quick action type, in which to cause a rapid application of the brakes fluid under pressure is fed from a brake pipe to a brake cylinder via a check valve and in which to cause the subsequent release of the brakes the pressure in the brake pipe is increased to operate the triple valve thereby exhausting the brake cylinder, wherein loading means is provided which is responsive to the pressure in the brake cylinder attaining a predetermined value to load said check valve to prevent unseating thereof when the pressure in the brake pipe attains a sufficient value to operate said triple valve to release the brakes.

Preferably said loading means is provided with delay means to delay actuation thereof unitl after the pressure in the brake cylinder has attained said predetermined value.

Preferably moreover, said means responsive to the pressure in the brake cylinder attaining a predetermined value comprises a loaded piston which is moveable within a cylinder to provide a chamber from which a communicating passage is provided to said brake cylinder, the area of said piston being substantially larger than the area of said check valve and said piston being so arranged that movement thereof within said cylinder applies a pressure to said valve substantially greater than the pressure in the brake cylinder.

In the example of the invention to be described herein said communicating passage is formed by a passage through the piston connecting rod and said piston and said delay means comprises a choke or constriction in said passage.

A specific embodiment will now be described, with reference to the single figure of the accompanying drawing which illustrates a sectionalized view of a triple-valve provided with loading means according to one example of the invention.

Referring to the drawing the triple valve arrangement comprises a plunger 2 and a flexible diaphragm 2a which divide an enclosure in a casing 1 to provide a first chamber 3 which is permanently in communication with the brake pipe through a passage 4 and a second chamber 5 which is permanently in communication with an auxiliary reservoir, which is not shown, through a passage 6. The auxiliary reservoir is chargeable with compressed fluid from the brake pipe via a passage 7 leading from chamber 3 to chamber 5 in which passage there is disposed a choke 8. At the entrance of passage 7 into chamber 5 there is disposed a valve comprising a valve closure member 9 which is biassed towards its seat 10 by a spring 11. The valve closure member 9 is connected to the diaphragm 2 by means of a rod 12 so that the opening and closing of said valve is responsive to the movement of 2.

Chamber 3 is provided with a valve comprising a valve closure member 13 urged into seating engagement with a valve seat 14 by a spring 15. This valve is situated between chamber 3 and a passage 16, which passage has disposed at the end distant from chamber 3 a check valve comprising a closure member 17 biassed towards engagement with a seat 18 by a spring 19, and serves to interconnect passage 16 with a further passage 20 which leads to the brake cylinder which is not shown.

Loading means for the member 17 comprises a cylinder 21, which projects from but is integral with the casing 1 of the triple valve and which is provided with a piston 22 and piston rod 23, 22 being moveable within 21 to provide a chamber 25 from which communication is provided via a bore 24 through 23 to the passage 20. Furthermore, choke 26 is provided in 24 to restrict the rate of flow of fluid therein to provide the aforesaid delay.

Chamber 5 is provided with a valve comprising a closure member 27 biassed towards engagement with a seat 28 by a spring 29, said valve providing means for interconnecting chamber 5 with a chamber 30 from which a passage 31 leads to passage 20 via a pressure limiting device which is not shown. A further passage 32 leads from chamber 31 to atmosphere, the entrance to 32 being provided with a valve comprising a closure member 33 biassed towards a seat 34 by spring 35.

Plunger 2 carries a rod 36 which extends into chamber 3 one one side of the diaphragm and extends through chamber 5 on to the other side of the diaphragm, through closure member 27 into the chamber 30. The length of the rod is determined by its function of holding 33 away from seat 34 when 2 is in its lowered position and allowing it to seat when 2 is in its raised position and also allowing closure member 13 to seat on 14 when the diaphragm is lowered and holding 13 away from seat 14 when the diaphragm is fully raised.

A collar 37 is provided on 36 on the lower side of 2 as shown to raise or lower 27 in dependence upon the position of 2.

In operation of the compressed fluid braking arrangement shown in the drawing, it will be assumed that 2 is initially in its lowermost position. When a brake application is to be made the brake pipe pressure is reduced such that the diaphragm 2 is displaced upwardly from its lowermost position and 27 is lifted away from seat 28 and 33 engages with seat 34. Fluid under pressure therefore flows from the aforementioned auxiliary reservoir via passage 6, chamber 5, chamber 30, passage 31 and the aforementioned pressure limiting device. The pressure limiting device is preset to restrict the brake cylinder pressure to a low value and therefore shuts off the passage from the auxiliary reservoir to the brake cylinder. A high pressure consequently exists in chamber 5 relative to that existing in chamber 3, and 2 is forced upwardly to unseat the closure member 13 to allow the fluid at brake-pipe pressure to flow to the brake cylinder via passage 16 and passage 20, closure member 17 having been opened by said fluid under pressure subsequent to the unseating of 13.

As the pressure of fluid in the brake cylinder increases, the pressure of fluid in passage 20 increases and fluid under pressure is therefore transmitted from 20 to chamber 25 through the bore 24 in the piston 22 and piston rod 23, the flow being restricted by the presence of the choke 26 in the bore. When the pressure in 25 attains a value, which is predetermined by the strength of spring 38, piston 22 moves downwardly against the effect of 38 until the end of 23 distant from 22 comes into contact with 17 to additionally load 17 into engagement with seat 18.

In order to release the brakes the brake cylinder is exhausted to atmosphere by increasing the brake pipe pressure to overcome the auxiliary reservoir pressure to enable 2 to be lowered to its lowermost position. In the latter position, 34 is unseated by rod 36 so that the brake cylinder discharges to atmosphere via passage 31, chamber 30 and passage 32.

When the brake pipe pressure is increased as above, if closure member 17 was not loaded by the loading means 22, 23, 38 the maximum pressure of fluid in passage 16 would be restricted to the pressure in the brake cylinder acting on the upper surface of the 17 plus the equivalent pressure of spring 19 and any increase above this value would cause 17 to be unseated and fluid would flow from the brake pipe into passage 20 and back to the pressure limiting device, which would exhaust the passage until the pressure reached the aforesaid predetermined value. Therefore it will be appreciated that the brake pipe pressure could not be sufficiently increased to drive the diaphragm 2 into its lowermost position to release the brakes.

The additional loading provided by the loading means 22, 23, 38 prevents the closure member 17 from being unseated during an increase of brake pipe pressure and thereby permits release of the brakes.

It will be appreciated that the diameter of piston 22, the strengths of springs 38 and 19 and the diameter of closure member 17 must be related such that, with the minimum brake cylinder pressure possible to operate the brakes, it is possible to achieve the maximum necessary brake pipe pressure to release the brakes without unseating closure member 17.

The purpose of the choke 26 is to retard the build up of pressure in chamber 21 to ensure that the pressure in the brake cylinder has attained the desired value prior to the loading of closure member 17 on to its seat 18.

Subsequent to the release of the brake, the brake cylinder having been exhausted, the piston 20 returns to its raised position.

Having thus described my invention what I claim is:

1. Compressed fluid braking apparatus comprising a triple valve of the quick action type, in which to cause a rapid application of the brakes fluid under pressure is fed from a brake pipe to a brake cylinder via a check valve and in which to cause the subsequent release of the brakes the pressure in the brake pipe is increased to operate the triple valve thereby exhausting the brake cylinder, wherein loading means is provided which is responsive to the pressure in the brake cylinder attaining a predetermined value to load said check valve to prevent unseating thereof when the pressure in the brake pipe attains a sufficient value to operate said triple valve to release the brakes.

2. Compressed fluid braking apparatus as claimed in claim 1 in which said loading means is provided with delay means to delay actuation thereof until after the pressure in the brake cylinder has attained said predetermined value.

3. Compressed fluid braking apparatus as claimed in claim 2 in which said means responsive to the pressure in the brake cylinder attaining a predetermined value comprises a loaded piston which is moveable within a cylinder to provide a chamber from which a communicating passage is provided to said brake cylinder, the area of said piston being substantially larger than the area of said check valve and said piston being so arranged that movement thereof within said cylinder applies a pressure to said valve substantially greater than the pressure in the brake cylinder.

4. Compressed fluid braking apparatus as claimed in claim 3 in which said communicating passage is formed by a passage through the piston connecting rod and said piston.

5. Compressed fluid braking apparatus as claimed in claim 4 in which said delay means comprises a choke or constriction in said passage.

References Cited by the Examiner

UNITED STATES PATENTS

| | | | |
|---|---|---|---|
| 2,034,307 | 3/1936 | McClure | 303—39 X |
| 3,022,117 | 2/1962 | Hewitt | 303—39 |

EUGENE G. BOTZ, *Primary Examiner.*